(12) United States Patent
Chisham et al.

(10) Patent No.: US 9,673,890 B2
(45) Date of Patent: Jun. 6, 2017

(54) USING MODULATION-TRANSCENDENT RF SAMPLED DIGITAL DATA OVER AN IP CONNECTION

(71) Applicants: Steven Allen Chisham, Wichita, KS (US); David Ditlow Hagood, Viola, KS (US)

(72) Inventors: Steven Allen Chisham, Wichita, KS (US); David Ditlow Hagood, Viola, KS (US)

(73) Assignee: Aeroflex Plainview, Inc., Plainview, NY (US)

( * ) Notice: Subject to any disclaimer, the term of this patent is extended or adjusted under 35 U.S.C. 154(b) by 212 days.

(21) Appl. No.: 14/541,742

(22) Filed: Nov. 14, 2014

(65) Prior Publication Data
US 2016/0142166 A1 May 19, 2016

Related U.S. Application Data

(60) Provisional application No. 61/904,561, filed on Nov. 15, 2013.

(51) Int. Cl.
*H04B 7/208* (2006.01)
*H04L 25/20* (2006.01)
*H04L 12/40* (2006.01)

(52) U.S. Cl.
CPC ............ *H04B 7/208* (2013.01); *H04L 12/40* (2013.01); *H04L 25/20* (2013.01)

(58) Field of Classification Search
None
See application file for complete search history.

(56) References Cited

U.S. PATENT DOCUMENTS

| | | | |
|---|---|---|---|
| 6,141,341 | A | 10/2000 | Jones |
| 6,272,120 | B1 | 8/2001 | Alexander |
| 6,363,065 | B1 | 3/2002 | Thornton |
| 6,366,771 | B1 | 4/2002 | Angle |
| 6,452,915 | B1 | 9/2002 | Jorgensen |
| 6,765,931 | B1 | 7/2004 | Rabenko |
| 6,766,291 | B2 | 7/2004 | Chu |
| 6,826,174 | B1 | 11/2004 | Erekson |
| 7,023,821 | B2 | 4/2006 | Wotherspoon |

(Continued)

OTHER PUBLICATIONS

US 6,594,080, 07/2003, Takasuka (withdrawn)
National Semiconductor, "LVDS Owners Manual", Spring 2004, National Semiconductor, all pages.*

*Primary Examiner* — Kwang B Yao
*Assistant Examiner* — Adam Duda
(74) *Attorney, Agent, or Firm* — Thomas A. O'Rourke; Bodner & O'Rourke, LLP

(57) ABSTRACT

The apparatus and methodologies used herein leverages RoIP to generically transport either conventional modulation (e.g., AM, FM, phase or pulse) or complex modulation (e.g., GMSK, CDMA, TDMA, OFDM, etc.) in real time or near real time across an internet protocol link, such as Gigabit Ethernet (GBE). The purpose of the invention is a method of creating a live, virtual, modulation transcendent link by using an internet protocol (IP) link to extend the natural range of a connection between an RF signal source (e.g. transmitter) and an RF receiving device (e.g. receiver). This methodology is referred to herein as radio frequency over internet protocol (RFoIP).

2 Claims, 2 Drawing Sheets

(56) References Cited

U.S. PATENT DOCUMENTS

2006/0067266 A1\* 3/2006 Ehlers .................. H04W 28/06
   370/328
2006/0268807 A1  11/2006 Meier \* cited by examiner

FIG. 2

| Bit resolution | Max throughput (estimated 80% efficiency on GBE) | Theoretical max sample rate (I/Q sample pairs) |
|---|---|---|
| 14 | 800k bits/sec | 28.6M samples/sec |
| 12 | 800k bits/sec | 33.3M samples/sec |
| 10 | 800k bits/sec | 40M samples/sec |
| 8 | 800k bits/sec | 50M samples/sec |

USING MODULATION-TRANSCENDENT RF SAMPLED DIGITAL DATA OVER AN IP CONNECTION

CROSS REFERENCE TO RELATED APPLICATIONS

This application claims priority on U.S. Provisional Application Ser. No. 61/904,561 filed on Nov. 15, 2003, the disclosures of which are incorporated herein by reference.

FIELD OF THE INVENTION

The present invention relates to improvements in the wireless radio over internet protocol (RoIP) communication systems, and a method of use.

BACKGROUND OF THE INVENTION

The monopoly of public switched telephone networks (PSTNs) using twisted-pair copper wiring and circuit protocols was challenged by systems that utilized Internet Protocol (IP) telephony and voice over an Internet Protocol (VoIP), as illustrated by U.S. Pat. No. 6,141,341 to Jones. Numerous systems utilizing and extending the streaming capabilities offered by VoIP continued to develop, but were not initially concerned with RF modulation. Transmitting and receiving radio communications were subsequently facilitated by the radio over internet protocol (RoIP), which functions similar to VoIP, but utilizes an added command layer. An example is shown by the linking of two radios over the Ethernet in U.S. Patent Application Pub. No. 2006/0067266 by Ehlers.

RoIP technology converts the radio signal to baseband (i.e., demodulates the signal), then digitizes the baseband information and sends it over IP, and lastly re-modulates the baseband information for transmission at the receiving end. To accomplish demodulation (i.e., extraction of the modulation information), and also subsequent re-modulation, requires fore-knowledge of the modulation type to be converted, and the requisite ability to demodulate and re-modulate the signal. Thus, current RoIP technology cannot provide a generic (modulation transcendent or modulation agnostic) transmission of the signal over an internet connection.

Moreover, the ability to transmit captured data files over IP (e.g., emailing a captured sample file) serves to transmit complex (digital) modulation generically, but does not accomplish transmission in real-time. There is no streaming of data samples, and no attempt to simulate an active RF link between the two devices.

The present invention is conceived and adapted to provide the capability to generically transport either conventional (e.g. AM, FM, phase, or pulse) modulation or complex modulation (e.g., Gaussian Minimum Shifting Key (GMSK), Code Division Multiple Access (CDMA), Time Division Multiple Access (TDMA), Orthogonal Frequency-Division Multiplexing (OFDM), and etc.) in real time across an internet protocol link, such as Gigabit Ethernet (GBE), without the need to know anything about that modulation other than its required occupied bandwidth.

OBJECTS OF THE INVENTION

It is an object of the invention to provide an improvement to the radio over internet protocol (RoIP).

It is another object of the invention to provide a means of transmitting radio signals across an internet protocol link without requiring knowledge of the modulation type.

It is a further object of the invention to provide a means to generically transport modulation (e.g., conventional AM, FM, PM or pulse, as well as complex modulation) across an internet protocol link.

It is another object of the invention to provide a means of utilizing an internet protocol link to extend the range of transmitted radio signals in real time or near real time.

Further objects and advantages of the invention will become apparent from the following description and claims, and from the accompanying drawings.

BRIEF DESCRIPTION OF THE DRAWINGS

FIG. 2 shows a chart of projected typical maximum sample rates for varying bit resolutions using a Gigabit Ethernet (GBE) connection, based on an assumed 80% packet efficiency (throughput rates would obviously have to be recalculated for different IP connections, such as 100BASE-T or 10 GigE).

DETAILED DESCRIPTION OF THE INVENTION

Figure 1:
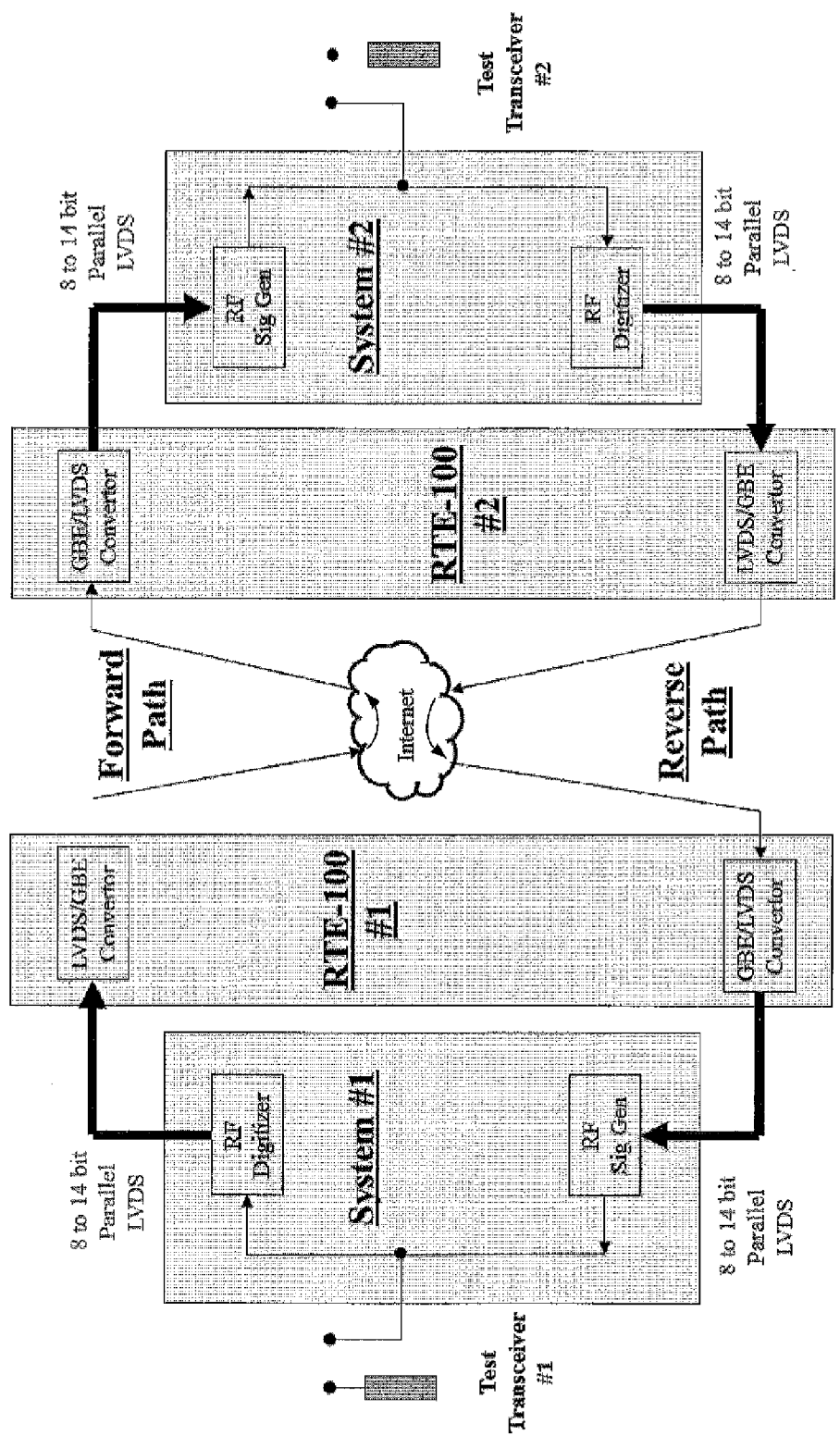
FIG. 1 illustrates use of RF digitizers and vector signal generators to establish a full duplex RF connection for streaming IQ sample data across IP in real-time.

Voice over internet protocol (VoIP) consists of a group of technologies utilized in a method of delivering voice and even multimedia communications (e.g., a combination of text, audio, still images, animation, video, etc.) over internet protocol networks, such as the internet. The process of using VoIP as a means of internet telephony is analogous to that used for communications of digital telephony.

Internet telephony refers to the provisioning of communications (voice, fax, SMS, voice-messaging) over the internet, rather than through the public switched telephone network (PSTN). The process of originating VoIP telephone calls is similar to traditional digital telephony, and involves signaling, channel setup, digitization of the analog voice signals, and encoding. However, for digital telephony, the digitized voice signal is transmitted over a circuit-switched network, utilizing, for example, time-division multiplexing (TDM) or frequency division multiplexing (FDM) to transmit and receive independent signals over a common path. The use of TDM for circuit mode communication in digital telephony may utilize a fixed number of channels, with each having a constant bandwidth per channel, and where the time domain is divided into several recurrent time slots of fixed duration, one for each sub-channel. In the use of FDM for digital transmissions, the total bandwidth available in the medium is divided into a discrete series of frequency sub-bands, where each sub-band is dedicated to the transmission of a particular signal. One example of the use of FDM is the broadcast of radio and television signals at different frequencies through the atmosphere concurrently, while another example is shown by cable television, in which numerous different television channels are carried simultaneously across a single cable.

With internet telephony, the digital information is packetized and transmission occurs as Internet Protocol (IP) packets over a packet-switched network. The packet-switched network provides for delivery of variable-bit-rate data streams (sequences of packets) over the shared network, and serves to allocate transmission resources as required according to one or more techniques, including statistical multiplexing or dynamic bandwidth allocation.

Voice over internet protocol (VoIP) may utilize existing broadband internet access through wired Ethernet or wireless WiFi. VoIP has been implemented using both proprietary and open standard protocols. Some examples of voice over internet protocols are H.323, the Media Gateway Control Protocol (MGCP), and the Session Initiation Protocol (SIP).

Radio over internet protocol (RoIP) is a communication concept similar to VoIP which utilizes an added command layer, but instead of implementing voice-to-voice telephone communication, it may facilitate two-way radio communications to enable its users to span large geographic areas. RoIP is also not proprietary or protocol limited. RoIP may specifically be implemented with one node of the network being a radio that is connected via IP to other nodes in the network, which may also be a two-way radio, but could also be a POTS telephone, or a software application running on a personal computer (e.g., the peer-to-peer system of Skype™).

The present invention leverages RoIP through the embodiment shown in FIG. 1, which includes using standard RF digitizers and vector signal generators to establish a full duplex RF connection capable of streaming IQ sample data across IP in real-time. In FIG. 1, a first transceiver ("Test Transceiver #1") is coupled to transmit into an RF Digitizer, which is coupled to an LVDS/GBE (low voltage differential signaling/gigabit Ethernet) converter for communication across the internet. The four LVDS data busses in FIG. 1 represent one embodiment of the present invention that may be used to stream digitized data. The use of the LVDS/GBE converters in this embodiment are central to the power of this invention, and serve to accept real time streaming sampled RF data, and to reprocess or package the data into IP format for live transmission over the internet. However, the method of the present invention may also be accomplished using a different high speed, real time digitizer bus, instead of the LVDS/GBE (or GBE/LVDS), to stream the sampled data (e.g., a PXIe bus).

Reversing this process on the other end of an IP link, a GBE/LVDS converter may receive the streaming digitized signal (thus unpacking the IP data and streaming it out as reconstructed samples), and may be coupled to an RF signal generator so as to re-broadcast a direct facsimile of the original transmission to a second transceiver ("Test Transceiver #2"). (Alternatively, for example, the streaming RF samples (e.g., IQ sample pairs in this example) could be directly ported via IP into signal analysis software for live evaluation and/or further manipulation. Another alternative would be to dump the IQ data via IP into remote memory storage for later retrieval and analysis.)

This arrangement provides the capability to generically transport conventional or complex modulation (e.g., Gaussian Minimum Shifting Key (GMSK), Code Division Multiple Access (CDMA), Time Division Multiple Access (TDMA), Orthogonal Frequency-Division Multiplexing (OFDM), etc.) in real time across an internet protocol link, such as a Gigabit Ethernet (GBE) link. Moreover, creating a similar link to that described above, but in the opposite direction, being between the second transceiver of System #2 in FIG. 1 and Test Transceiver #1, demonstrates how one could simulate a complete, live, full duplex connection over an IP link.

This combination of technology permits real-time data streaming using modulation transcendent RF sampled digital data over an IP connection. This provides for unidirectional applications like live monitoring of remote RF transmitters (e.g., monitoring signal integrity, protocol activity, or performing remote signal intelligence (sigint) activities), as well as real-time bidirectional simplex, half-duplex, and full-duplex RF transceiver connectivity at distances well beyond the normal range of an RF transmitter or transceiver. (As noted above, some other alternatives include porting the sampled transmission via IP directly into signal processing software for analysis and/or further manipulation, or possibly even some remotely located memory for storage and possible later evaluation.)

Because this method is generic, all the user must know is the approximate frequency of interest and what constitutes an appropriate instantaneous sampled bandwidth, such that the modulation bandwidth of the intended signal is contained within the capture bandwidth of the digitizer. By accounting for this information, the user can set the RF digitizer's capture frequency and sampling rate. By sampling modulation generically, any RF signal (provided the sample rate is high enough to provide the required modulation fidelity for retransmission) can be linked over great distances, providing "seamless" RF connectivity between conventional, as well as software-defined RF transmitters, receivers, and transceivers, as long as the modulation technology used can endure the incurred resultant time delay inherent in the chosen IP link. Use of the forward and reverse paths described in FIG. 1 provides the capability, for example, of remote interoperability testing of a full-duplex RF system by transmitting the forward and reverse waveforms in their appropriate directions over the internet, in a system referred to herein as the radio frequency over internet protocol (RFoIP).

Successful in-house testing of this system consisted of generating an RF waveform in a facility in a first city, capturing and transmitting the signal as IQ sample pairs (i.e., digitizing a 5 MHz LTE uplink at 10 M samples/sec) using the bi-directional system of FIG. 1 over IP to a second facility in a distant second city, where the waveform was reconstructed as RF (i.e., transmitted it out of the signal generator). The waveform was then re-digitized and sent back via the same high speed IP link for signal analysis in the first city, where the LTE waveform was demodulated, observing its constellation and modulation characteristics (e.g., error vector magnitude (EVM), frequency accuracy, adjacent channel power (ACP), etc.) to validate through comparison that the signal quality of the retransmitted signal served as a reasonable and faithful facsimile of the original transmitted waveform. This simulated full-duplex RF connectivity between the first city and the second city. This system is highly applicable for advancing testing, permitting cloud based, remote, scalable, on-demand RF parametric and interoperability testing for design and production around the world, which is particularly beneficial and useful with respect to Asia and Latin America.

It should be noted that the present application is not limited to IQ data transmission as a method of establishing this live RF link. The objective of the "RF Over IP" technique is to generically stream digitized complex modulation samples in real-time or near real-time, using one of three generic (or modulation agnostic) transfer techniques. These three methods include use of:
 (a) rectangular (or Vector) modulation (using IQ sample pairs); or
 (b) polar modulation (magnitude and angle); or
 (c) directly streaming sampled RF or down-converting to an IF and transferring raw IF samples.

Given any one of these, the other two can be mathematically derived. Consequently, the objective of the "RF Over IP" technique is to generically stream digitized complex modulation samples in real-time or near real-time using one of these three generic (or modulation agnostic) transfer techniques.

The examples and descriptions provided herein merely illustrate a preferred embodiment of the present invention. Those skilled in the art and having the benefit of the present disclosure will appreciate that further embodiments may be implemented with various changes within the scope of the present invention. Other modifications, substitutions, omissions and changes may be made in the design, size, materials used or proportions, operating conditions, assembly sequence, or arrangement or positioning of elements and members of the preferred embodiment without departing from the spirit of this invention.

We claim:

1. Apparatus for real-time data streaming using modulation-transcendent RF sampled digital data over an IP connection, said apparatus comprising:
   a first transmission station, said first transmission station comprising:
      a transceiver;
      an RF digitizer, said transceiver configured to transmit to said RF digitizer, and said RF digitizer configured to digitize the transmission by said transceiver;
      a low voltage differential signaling/gigabit Ethernet (LVDS/GBE) converter, said LVDS/GBE converter configured to receive the digitized transmission from said RF digitizer, and to communicate the digitized transmission over the internet;
   a second transmission station, said second transmission station comprising:
      GBE/LVDS converter, said GBE/LVDS converter configured to receive the digitized transmission from the internet;
      a transceiver;
      an RF signal generator, said RF signal generator configured to receive the digitized transmission from said GBE/LVDS converter and to convert the digitized transmission to a signal, and said RF signal generator further configured to transmit the signal to said second transceiver;
      an RF digitizer, said transceiver of said second transmission station configured to transmit to said RF digitizer therein, and said RF digitizer of said second transmission station configured to digitize the transmission; and
   a LVDS/GBE converter, said LVDS/GBE converter of said second transmission station configured to receive the digitized transmission from said RF digitizer therein, and to communicate the digitized transmission over the internet;
   and
   wherein said first transmission station further comprises:
      a GBE/LVDS converter, said GBE/LVDS converter of said first transmission station configured to receive the digitized transmission from the internet; and
      an RF signal generator, said RF signal generator of said first transmission station configured to receive the digitized transmission from said GBE/LVDS converter therein and to convert the digitized transmission to a signal, and said RF signal generator of said first transmission station configured to transmit said signal to said first transceiver therein.

2. The apparatus according to claim 1, wherein each said GBE/LVDS converter is configured to provide resolution in the range of 8 bits to 14 bits.

* * * * *